United States Patent
Deshpande et al.

(10) Patent No.: US 11,277,653 B2
(45) Date of Patent: Mar. 15, 2022

(54) SYSTEMS AND METHODS FOR NAVIGATING VEHICLE INVENTORY

(71) Applicant: Capital One Services, LLC, McLean, VA (US)

(72) Inventors: Amit Deshpande, McKinney, TX (US); Liju Mathews, Plano, TX (US); Satish Chikkaveerappa, McKinney, TX (US); Mithra Kosur Venuraju, Frisco, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/657,548

(22) Filed: Oct. 18, 2019

(65) Prior Publication Data

US 2021/0120297 A1  Apr. 22, 2021

(51) Int. Cl.
| | |
|---|---|
| *G06Q 30/06* | (2012.01) |
| *H04N 21/414* | (2011.01) |
| *G06F 16/9535* | (2019.01) |
| *G07C 5/00* | (2006.01) |
| *H04N 21/25* | (2011.01) |
| *G06Q 50/28* | (2012.01) |

(52) U.S. Cl.
CPC ... *H04N 21/41422* (2013.01); *G06F 16/9535* (2019.01); *G06Q 50/28* (2013.01); *G07C 5/008* (2013.01); *H04N 21/251* (2013.01)

(58) Field of Classification Search
None
See application file for complete search history.

(56) References Cited

U.S. PATENT DOCUMENTS

| | | | |
|---|---|---|---|
| 5,813,007 A | 9/1998 | Nielsen | |
| 2005/0256782 A1* | 11/2005 | Sands | G06Q 10/087 705/26.41 |
| 2007/0061220 A1* | 3/2007 | Vaid | G06Q 30/02 705/14.52 |
| 2010/0299190 A1* | 11/2010 | Pratt | G06Q 30/0282 705/14.4 |
| 2011/0047480 A1 | 2/2011 | Venkataraman | |
| 2016/0189260 A1* | 6/2016 | Nagla | G06Q 40/025 705/26.4 |
| 2016/0253710 A1 | 9/2016 | Publicover et al. | |

OTHER PUBLICATIONS

CarMax launches comprehensive used car online recommendation tool. (Sep. 3, 2008). Business Wire Retrieved from https://dialog.proquest.com/professional/docview/1070319603?accountid=161862 (Year: 2008).*

* cited by examiner

*Primary Examiner* — Allison G Wood
*Assistant Examiner* — Ashley D Preston
(74) *Attorney, Agent, or Firm* — Hunton Andrews Kurth LLP

(57) ABSTRACT

Embodiments of the present disclosure provide systems, methods, and devices for utilizing an application to alert a user to detected changes to inventory data. Example embodiments relate to a predictive model and development of a predictive model using machine learning techniques. Example embodiments of systems and methods may utilize web-based applications and plug-ins, extensions, or add-ons thereof for facilitating communication and presenting dynamic information to a user.

20 Claims, 11 Drawing Sheets

SYSTEMS AND METHODS FOR NAVIGATING VEHICLE INVENTORY

FIELD OF THE INVENTION

This disclosure relates to systems and methods for receiving a set of terms or criteria from a user and alerting a user based on a detected change associated with inventory satisfying the user terms or criteria.

BACKGROUND

The process of purchasing a vehicle frequently involves a buyer navigating a large variety of potential vehicles with a large number of options and features. This process can involve multiple parties and a significant number of vehicle choices that must be individually monitored by the buyer.

To understand a valuation or deal associated with a vehicle, a user may be required to frequently check in on the status of a vehicle or a series of vehicles. This may be a cumbersome process requiring the user to monitor and/or analyze a large amount of information, some of which may not be readily available. Additionally, vehicle dealers are typically unable to determine which individual users may be interested in a particular vehicle or type of vehicle. Without this information, vehicle dealers are unable to notify potential purchasers of sales or new inventory in which a particular user may be interested. To the extent vehicle dealers attempt to notify potential purchasers, the notifications may be based on outdated or insufficient information. As such, the notifications may not be tailored to the interests or preferences of a particular user.

Therefore, a need exists for a system which facilitates communication and understanding between parties and facilitates a user selecting one or more vehicles and staying informed on any updates regarding the vehicles.

SUMMARY

Therefore, it is an object of this disclosure to describe systems and methods for presenting a list of potential vehicles for purchase to a user based on vehicle criteria received from the user. A user may be provided with information from one or more databases containing information related to a vehicle or a vehicle selection criteria and to alert the user to any changes in vehicle inventory related to the user's selection.

Embodiments of the present disclosure provide a system comprising a user device displaying a user interface, wherein the user interface receives vehicle selection terms from a user via an input device operably connected to the user device; a data storage server containing vehicle inventory data; and an application communicatively connected to the user interface and the data storage server. The application receives vehicle selection terms from the user interface; receives vehicle inventory data from the data storage server; and transmits an alert to the user interface upon detecting a change to the vehicle inventory data which is associated with the vehicle selection terms.

Embodiments of the present disclosure provide a method comprising receiving vehicle selection criteria from a user via a user interface, wherein the user interface is displayed on a user device; receiving vehicle inventory data from a database, wherein the vehicle inventory data comprises information associated with a vehicle; selecting at least one vehicle from the vehicle inventory data based on the vehicle selection criteria; displaying information associated with a selected vehicle to the user on the user device; and alerting the user to changes in the vehicle inventory data associated with the vehicle selection criteria. Some embodiments further comprise receiving credit information from a user via the user interface; applying a predictive model to the received credit information and vehicle selection criteria to determine whether to present a pre-approved offer of credit to the user; and displaying pricing information associated with a selected vehicle upon determining to present a pre-approved offer of credit to the user.

Embodiments of the present disclosure provide a user retention system comprising a user device comprising at least one input device; a user interface, wherein the user interface receives vehicle selection criteria and financing information from a user; a vehicle inventory database communicatively connected to the user interface wherein the vehicle inventory database contains vehicle information; and an application communicatively connected to the user interface. The application receives vehicle selection criteria and financing information from the user interface; receives vehicle information from the vehicle inventory database; applies a predictive model to the received vehicle selection criteria, financing information, and vehicle information to determine whether to present a pre-approved offer of credit to the user; upon determining to present a pre-approved offer of credit to the user, displays vehicle information to the user; and sends an alert to the user interface upon detecting a change to the vehicle information associated with the vehicle selection criteria.

Further features of the disclosed design, and the advantages offered thereby, are explained in greater detail hereinafter with reference to specific example embodiments illustrated in the accompanying drawings.

DETAILED DESCRIPTION OF EXAMPLE EMBODIMENTS

The present disclosure provides systems, methods, and devices for developing and utilizing a system for alerting a user to changes in inventory data associated with user specified terms and/or user selected vehicles. In some embodiments, the systems and methods incorporate machine learning techniques and/or predictive modeling to facilitate determining suggested vehicle selection criteria, future actions and/or whether to present an offer of credit to a user.

In some on-line vehicle research applications, a user at a home computer or other user device logs on to a website to search for a vehicle. The user enters terms and/or criteria relating to a desired vehicle into the website. In some models, once a user has input the options, features, and/or other variables desired in a vehicle, that information may be transmitted to a server or application in communication with a data storage server containing vehicle inventory data. The application may receive vehicle selection terms from the user as well as vehicle inventory data form the data storage server. The application may then periodically monitor the data storage server to detect a change to the inventory data that is associated with the vehicle selection terms provided by the user. This allows the user to access current information related to the user's vehicle selection terms without manually or continuously performing an updated vehicle search themselves.

In some embodiments, the disclosed system may comprise a plug-in, add-on, or extensions to a web-browser, web-based program, or other online software. In some embodiments, the system comprises an application in data communication with the user interface and data storage containing vehicle inventory data. The application may be configured to perform vehicle searches using the vehicle selection terms entered by a user and determine if a vehicle satisfies payment criteria entered by a user. In some embodiments, the application provides notifications to the user if there is a change in the vehicle inventory data for vehicle that satisfies some or all of the user's vehicle search terms. Such a change may include, for example, a discount on the vehicle, the vehicle being sold, the vehicle being moved to a different location, a similar vehicle becoming available, or the like.

In some embodiments, the user may bookmark or otherwise select vehicles in which the user is interested. The application may operate in the background until it detects a change to the vehicle inventory that is associated with a vehicle the user has selected or a vehicle that is similar to a vehicle the user has selected. In some embodiments, the user may be able to establish an expected market price by observing the sale of one or more similar vehicles the user has selected. In some embodiments, a user may be able to easily compare vehicles with similar, but distinct features such as, for example, a vehicle with leather seats and a corresponding vehicle with cloth seats.

Figure 1:
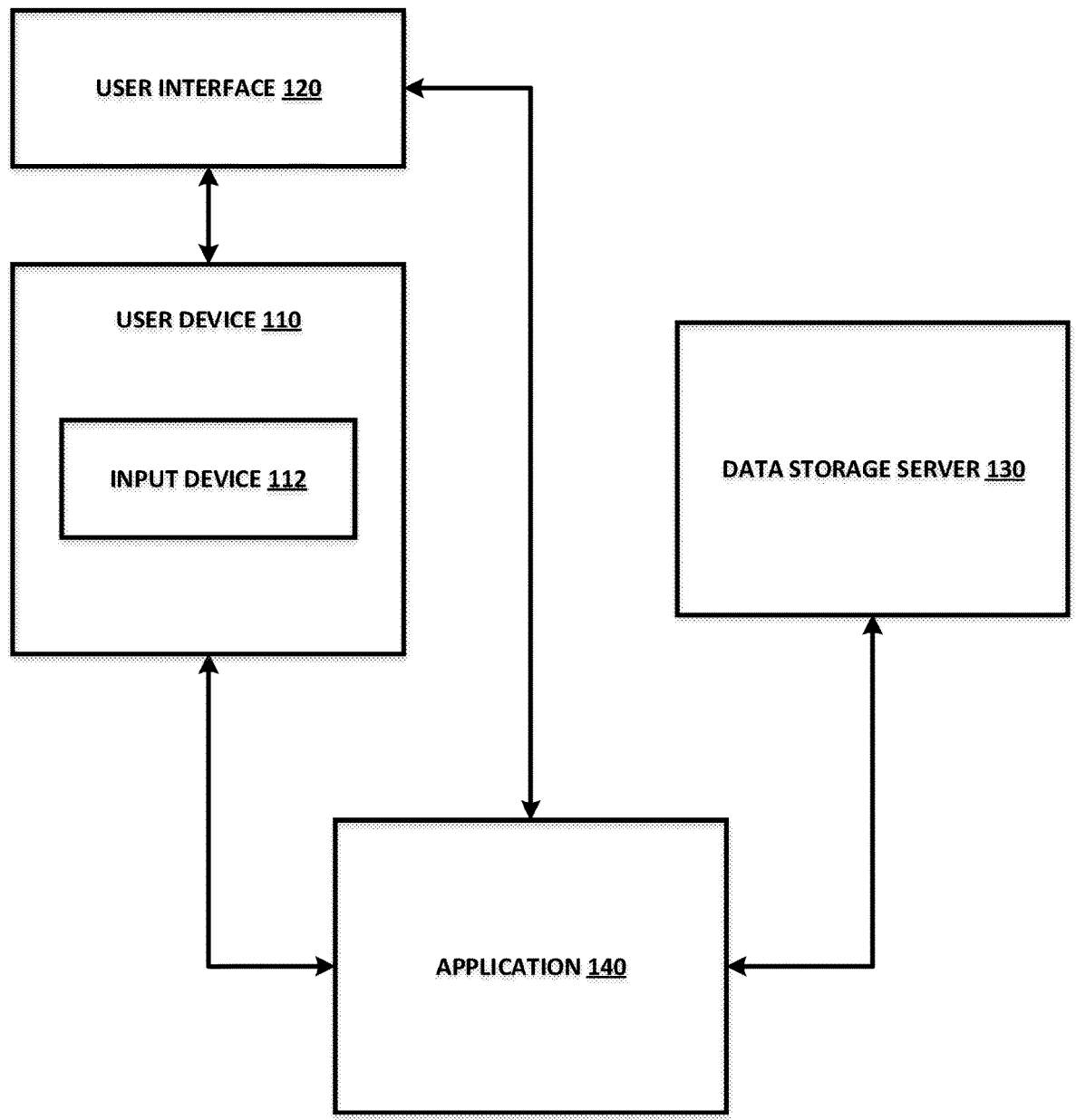
FIG. 1 illustrates an inventory notification system according to an example embodiment.

FIG. 1 illustrates a system according to an exemplary embodiment. In this embodiment, the system 100 includes a user device 110 displaying a user interface 120, a data storage server 130 and an application 140 that is communicatively connected to the user interface and the data storage server. An input device 112 is operably connected to the user device 110 and may be used by a user to enter information and/or terms into the user interface 120.

User device 110 may be, but is not limited to being a smartphone, laptop, desktop computer, tablet computer, personal digital assistants, thin clients, fat clients, Internet browsers, customized software application or kiosk. It is further understood that the user device 110 may be of any type of device that supports the communication and display of data and user input. The present disclosure is not limited to a specific number of user devices, and it is understood that the system 100 may include a single user device or multiple user devices.

In some embodiments, user device 110 comprises a memory. The memory may be a read-only memory, write-once read-multiple memory or read/write memory, e.g., RAM, ROM and EEPROM. The user device 110 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

User device 110 may further comprise wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. This network may include, without limitation, telephone lines, fiber optics, IEEE Ethernet 902.3, a wide area network, a local area network, a wireless personal area network, a wide body area network or a global network such as the Internet. User device 110 may also, but need not, support a short-range wireless communication interface, such as near field communication, radio-frequency identification, and Bluetooth.

User device 110 comprises at least one display and input device. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user device that is available and supported by the user device 110, such as, for example, a touch-screen, keyboard, mouse, cursor-control device, touch-screen, microphone, digital camera, video recorder, or camcorder. These devices may be used to enter information and interact with the system 100 as described herein.

In some embodiments, user interface 120 is displayed on user device 110. User interface 120 may be a program of software which may be run on user device 110 or a remote server. In some embodiments, user interface 120 is run on a remote server which is in data communication with the user device 110. User interface 120 is configured to receive input from a user via an input device operably connected to the user device 110. In some embodiments, the user interface 120 receives vehicle selection terms from a user. In some embodiments, the user interface 120 receives payment criteria, credit information, and/or financing information from the user. In some embodiments, the user interface 120 is communicatively connected to the application 140.

In some embodiments, application 140 may be any software, program, email client, or web browser that supports the communication and display of data, information, and input received from a user and/or from a server or other application. In some embodiments, application 140 may comprise any plug-in, add-on, and/or extension associated with a software, program, email client, and/or web browser.

The user interface 120 and/or application 140, may be, or may be run on, dedicated server computers, such as bladed servers, or may be personal computers, laptop computers, notebook computers, palm top computers, network computers, mobile devices, or any processor-controlled device capable of supporting the system 100.

In an embodiment, a data storage server 130 may contain vehicle inventory data including, but not limited to make, model, year, condition, address, date, month, season, location, city, state, zip code, body style, trim package, user price, whole-sale price, invoice price, auction price, mileage, four-wheel drive, all-wheel drive, two-wheel drive, front-wheel drive, rear-wheel drive, automatic transmission, manual transmission, exterior color, exterior accents, exterior trim, interior color, interior accents, interior trim, interior materials, number of owners, previous accidents, theft history, fuel economy, vehicle reviews, vehicle star rating, owner satisfaction rating, manufacturer suggested retail price (MSRP), allow wheels, aluminum wheels, backup camera, Bluetooth connectivity, cargo attachments, air-conditioning, heating, vented seats, cooled seats, cloth seats, leather seats, power seats, navigation system, additional power connections, power mirrors, power steering, premium audio/video features, sport suspension, sunroof/moon roof, additionally technology package, cruise control, adaptive cruise control, lane change assist, financing terms, insurance rates, amount financed, annual percentage rate (APR), total monthly payment, manufacturer incentives, and/or additional products available for a vehicle, such as, for example, service contracts, GAP insurance, time and wheel protection, extended warranties, whether a vehicle is used or new, if a vehicle was previously leased or owned, and/or if a vehicle was part of a rental and/or corporate fleet.

While FIG. 1 illustrates a single instance of user interface 120, data storage server 130, and application 140, it is understood that other embodiments may use multiple computer systems or multiple servers as necessary or desired to support a user and may also use back-up or redundant servers to prevent network downtime in the event of a failure of a particular server. It is further understood that in some embodiments, a plurality of additional data servers may store information and/or data utilized by the system 100.

A user may operate the disclosed system by entering vehicle selection terms into a user interface 120 that is displayed on a user device 110. The user enters the vehicle selection terms using an input device 112 that is operably connected to the user device 110. An application 140 is communicatively connected to the user interface 120 and a data storage server 130. In operation, the application 140 receives the vehicle selection terms entered by the user from the user interface 120. The application 140 receives vehicle inventory data from the data storage server 130. The application 140 also transmits an alert to the user interface 120 upon detecting a change to the vehicle inventory data received from the data storage server 130 which is associated with the vehicle selection terms entered by the user.

The above system allows a user to select a type of vehicle the user is interested in and describe that type of vehicle by entering the appropriate vehicle selection terms. The application 140 may then monitor vehicle inventory data to filter and/or select vehicles that meet the user's vehicle selection terms. The application 140 may present the selected vehicles to the user using the user interface 120 displayed on the user device 110. If a user enters vehicle selection terms related to, for example, vehicle make, vehicle model, vehicle year, vehicle features, price, or location, and the application 140 detects a change in the vehicle data associated with one of these terms, the application 140 transmits an alert to the user interface 120. This allows the application 140 to update the user to changes in the vehicle inventory data in which the user may be interested. Disclosed embodiments allow the user to remain informed about the vehicle inventory data related to their vehicle selection terms without the need to manually perform frequent searches of the vehicle inventory data and then compare the results of one search to another. This allows the user to save time and while also maintaining near constant awareness of changes in the vehicle marketplace. This system may benefit car dealers, sellers, and lenders as it facilitates the user locating and ultimately purchasing a desired vehicle. In some embodiments, the disclosed system also serves to communicate price reductions or other changes made by a seller to a potential customer who is interested in that type of vehicle.

In some embodiments, the application 140 is configured to automatically execute an application update without input from the user. In such embodiments, the application 140 may maintain itself in an up-to-date version to, for example, provide the user with access to the current vehicle inventory data.

In addition to entering vehicle selection terms, in some embodiments, the user enters payment criteria. The user interface 120 may be configured to receive payment criterial from the user. In some embodiments, the application 140 transmits an alert to the user interface 120 upon identifying a vehicle from the vehicle inventory data that satisfies the user's vehicle selection terms and payment criteria.

In some embodiments, the user may input credit information into the user interface 120. In such embodiments, the user interface 120 receives credit information from the user. In some embodiments, the application 140 presents an offer of credit to the user via the user interface 120 based on the credit information.

Figure 2:
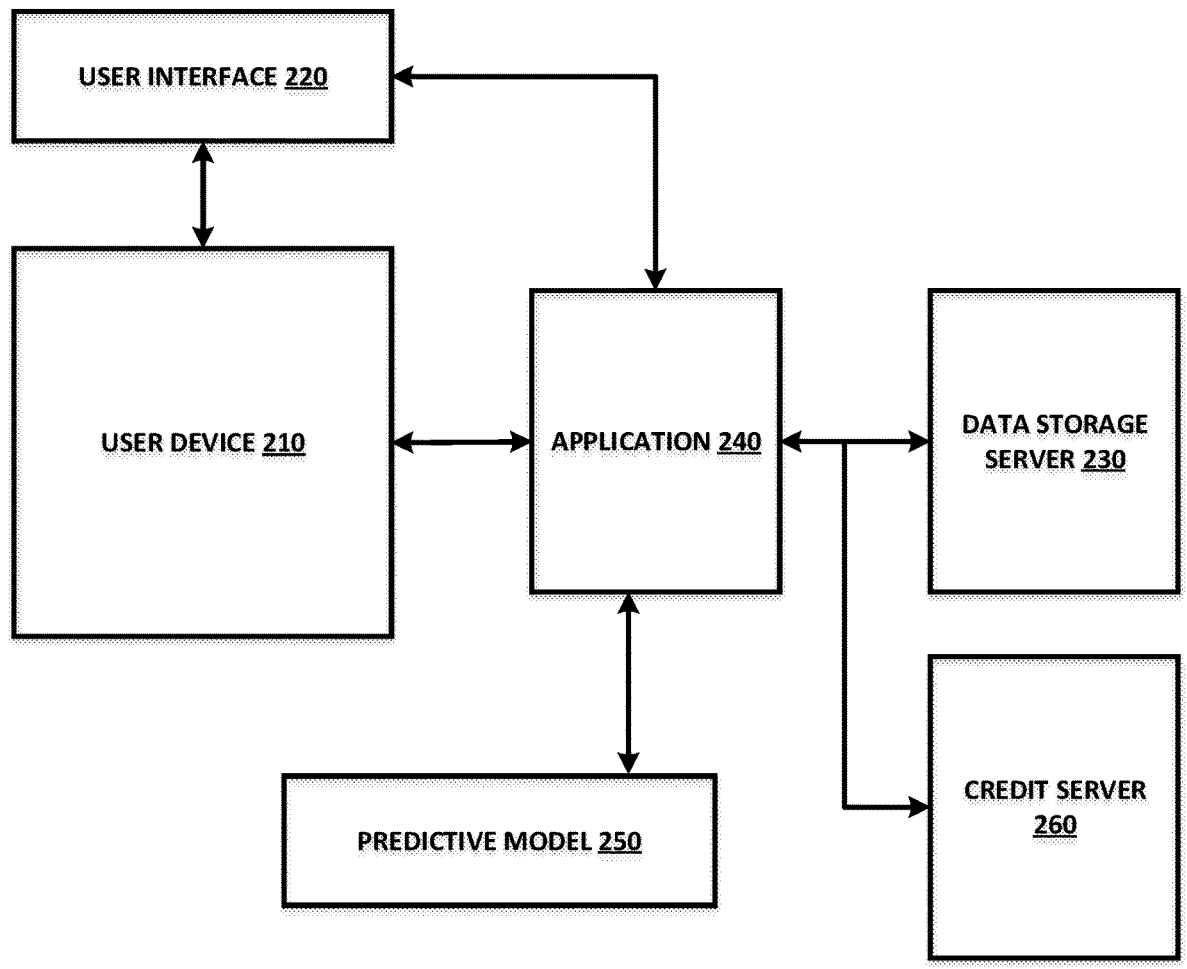
FIG. 2 illustrates an inventory notification system with a predictive model according to an example embodiment.

FIG. 2 illustrates a system according to an exemplary embodiment. In this embodiment, the system 200 includes a user device 210 displaying a user interface 220, a data storage server 230 and an application 240 that is communicatively connected to the user device 210, the user interface 220, and the data storage server 230. Application 240 may be configured to apply a predictive model 250 to any data, input, and/or information received by the application 240. The system 200 may include a credit server 260 or other third party server in communication with the application 240. The system 200 of FIG. 2 may reference the same or similar components as illustrated in FIG. 1.

In some embodiments, user device 210 displays user interface 220. User interface 220 may be a program of software which may be run on the user device 210 or may be run on a remote server. The user interface 220 may be configured to receive input from a user via an input device operably connected to the user device 210. The user may enter vehicle selection terms into the user interface 220 using the user device 210. The application 240 is configured to receive vehicle selection terms from the user interface 220, receive vehicle inventory data from the data storage server 230; and transmit an alert to the user interface 220 upon detecting a change to the vehicle inventory data which is associated with the vehicle selection terms.

In some embodiments, the application 240 is configured to record user interface activity and apply a predictive model 250 to the user interface activity to determine a subsequent action. In some embodiments, the application 240 is in data communication with the user interface 220 and configured to, with the user's permission, record a user's activity on the user interface 220. By recording and analyzing the user interface activity, the application 240 is able to determine a subsequent action such as, for example, presenting vehicle information to a user, suggesting vehicle selection terms, and/or suggesting payment criteria. In some embodiments, the subsequent action may include updating the vehicle selection terms, sending a notice, alert, or request to a third party, sending a notice, alert, or request to a user, and/or or sending an incentive or promotional offer to a user.

In some embodiments, the user may enter credit information into the user interface 220. In some embodiments, the user may request a pre-approval request using the user interface 220. In some embodiments, the user interface 220 may be in communication with a credit server 260 and/or other third party servers. Upon receipt of a pre-approval request from the user, in some embodiments, the application 240 applies a predictive model 250 to the received credit information and vehicle selection terms to determine whether to present a pre-approved offer of credit to the user. In some embodiments, the application 240 may transmit the received credit information and/or vehicle selection terms to a credit server 260 or other third party server and submit a pre-approval request to the credit server 260. In some embodiments, the predictive model 250 may include continuous learning capabilities that allow it to incorporate additional and/or revised data as it becomes available.

In some embodiments, credit server 260 may contain user information data from one or more credit bureaus or other reporting agencies. This may include data from a consumer reporting agency (e.g., TransUnion, Equifax, Experian, and Innovis), a business reporting agency (e.g., Dun & Bradstreet, Experian Business, Equifax Commercial, Cortera, Southeastern Association of Credit Management, and PayNet), a credit rating agency (e.g., Standard & Poor's, Moody's Investors Service, and Fitch Ratings), other data collection agencies (e.g., Small Business Financial Exchange, Inc. and Payment Reporting Builds Credit, Inc.), or a combination thereof. While the foregoing list of credit data sources is exemplary, it is understood that the present disclosure is not limited thereto, and credit server 260 may include data from one or more U.S. or foreign agencies. In an embodiment, the credit server 260 may contain credit score and associated information.

In some embodiments, upon determining to present a pre-approved offer of credit to the user, the user interface 220 displays price and financing information associated with a vehicle to the user. In some embodiments, upon displaying price and financing information to a user, the application 240 prompts the user to select a preferred vehicle. In some embodiments, upon determining to present a pre-approved offer of credit to the user, the application transmits the vehicle selection terms to a vehicle dealer. This may facilitate communication between the user and the dealer as, in some embodiments, the dealer has an indication that the user is interested in a particular vehicle and has approved financing for the purchase of the vehicle.

In some embodiments, the predictive model 260 may be developed by machine learning algorithms. In some embodiments, the machine learning algorithms employed may include gradient boosting machine, logistic regression, neural networks, or a combination thereof, however, it is understood that other machine learning algorithms may be utilized. In some embodiments, the predictive model 260 may be developed using historical data associated with a vehicle, vehicle inventory data, user information, user activity, user credit information, vehicle selection terms, and/or vehicle sales information.

In some embodiments, the application 240 may be configured to request a price adjustment from a vehicle dealer. In one non-limiting example, the application 240 may determine that a dealer vehicle satisfies the vehicle selection terms received from a user but is priced slightly outside of the user's payment criteria. In this example, the application 240 may send a price adjustment request to the vehicle dealer. The price adjustment request may, in some cases, indicate that a user is likely to purchase the vehicle if the dealer is able to reduce the price to a certain amount. In some embodiments, the application 240 may transmit a notice to the user interface 220 that the application 240 is requesting a price adjustment on a vehicle that satisfies the user's vehicle selection terms.

Figure 3:
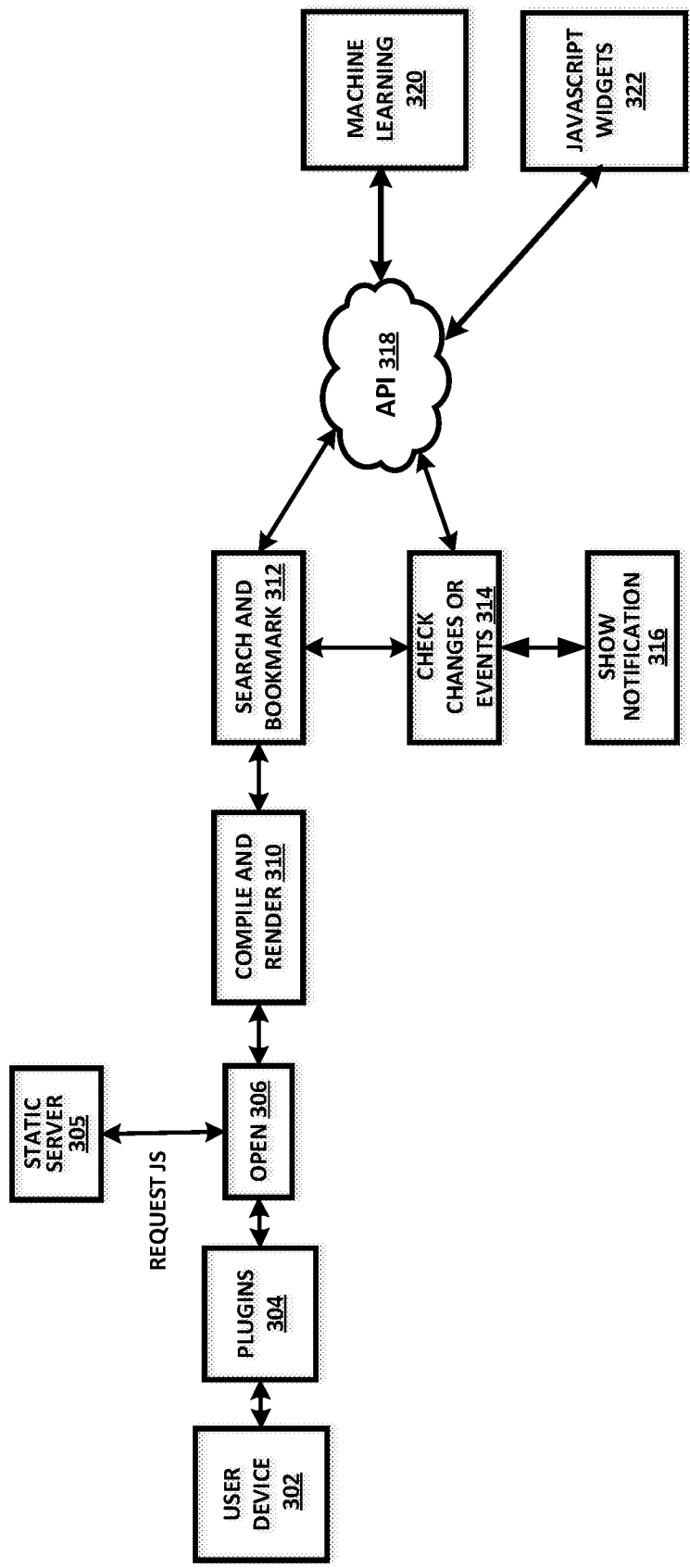
FIG. 3 is an operational diagram of a notification system according to an example embodiment.

FIG. 3 is an operational diagram illustrating the structure and function of a notification system 300 according to an example embodiment. In this embodiment, the system 300 includes a user device 302 operating one or more plugins 304 within, or in connection with, a web browser. The plugins 304 may alert the user by presenting alerts in a browser and/or elsewhere on the user device 302 by changing the icon status for various changes and events relating to vehicle research, marketing, and sales. Exemplary changes and events include, without limitation, the announcement of a price for one or more new vehicles, a change in price, availability, expected availability, financing options, location, or trade-in status of one or more vehicles. In some examples, the alerts may include the display of an icon or graphic, a change in the color, size, or shape of an already displayed icon or graphic, a push notification, a pop-up notification, a prompt, a pop-window, or other visual alerts, audible alerts (e.g., a verbal alert, playing a sound, playing a song or a portion of a song, playing a ring tone), a physical alert (e.g., a vibration or haptic alert), and a combination thereof.

The plugins 304 may be software additions that allow for the customization of computer programs, applications, and browsers as well as the customization of website content. The plugins 304 may be a software program implemented with hypertext markup language (HTML), JavaScript, cascading style sheets (CSS) and other web-based technologies. The plugins 304 may perform data-based customization functions, which may include providing alerts, such as push notifications. The web browser may open 306 the plugins, causing a request to be made to a static server 305. The static server 305 may include a computer with an HTTP server. The static server 305 may send files, which may be hosted internally or retrieved from an external location, in response to the request. The browser may compile and render 310 the files as necessary before running the plugins 304.

In system 300, the user may take actions such as searching and bookmarking 312 using an application programming interface (API) 318. The API 318 may be associated with an application on a server and provide various ways for the user and/or plugins 304 to interact with the application. For example, the user may browse to a website selling cars and enter search criteria such as make, model, and mileage and submit the search. The search may return search results and the user may save the search and/or results to an account on the website. The user or the plugins 304 may store a website address, uniform resource locator (URL), or uniform resource identifier (URI) as a bookmark in the browser. As another example, a user may browse to a website and view pages relating to one or more vehicles without searching for a particular vehicle, and the plugins 304 may collect data relating to one or more vehicles from these activities as well. As another example, a user may user an in-browser messaging application, web-based social media, or web-based email, to send messages relating to one or more vehicles, and the plugins 304 may collect data relating to one or more vehicles from these activities.

In system 300, the plugins 304 may check for changes or events 314 relating to one or more vehicles for which data has been collected or that have otherwise been identified as potentially of interest to the user. For example, the user may save two vehicles as bookmarks and with instructions to track changes such as price and APR. The plugins 304 may check for changes or events 314 using API 318 and present alerts on the user device 302 when changes or events are detected. The plugins 304 may show notification 316 of changes to the two saved vehicles to the user.

For example, the user may be interested in a particular make, model, year, and/or price of a vehicle that is currently not in stock. The plugins 304 may check for changes or events 314 in vehicle inventory and show notification 316 to the user when the vehicle is in stock. For example, the user may be interested in a car that sold out and the plugins 304 may show notification 316 on the user device of a similar car that is available. For example, the plugins 304 may show notification 316 on the user device 302 when a dealer is running a special or promotion on cars of interest. For example, the plugins 304 may show notification 315 on the user device 302 relating to changes in negotiations with a dealer on an offer for a car. For example, the plugins 304 may show notification 316 on the user device when a better vehicle becomes available that meets the user's search criteria.

In system 300, the application server associated with API 318 may apply machine learning 320 to determine various events for the plugins 304 to alert the user. In system 300, one or more widgets 322, such as JavaScript widgets, may support the plugins 304, application, and API 318. JavaScript widgets 322 alongside the plugins 304 may provide additional capabilities or features related to searching, bookmarking, and collecting data 312, and showing notifications 316 on the user device 302.

In some examples, JavaScript widgets 322 may provide a standard codebase with new wrappers for additional browser support. For example, JavaScript widgets 322 may include JQuery, a JavaScript library for document object model (DOM) tree traversal and manipulation as well as event handling, CSS animation, and Ajax. JavaScript widgets 322 may include JavaScript object notation (JSON) open-standard file format that uses human-readable text to transmit data objects consisting of attribute-value pairs used for applications such as serving as a replacement for extensible markup language (XML) in Ajax systems. In system 300, a browser may run plugins 304 using HTML, CSS, JavaScript, and JQuery to generate final output plugins 304.

Figure 4:
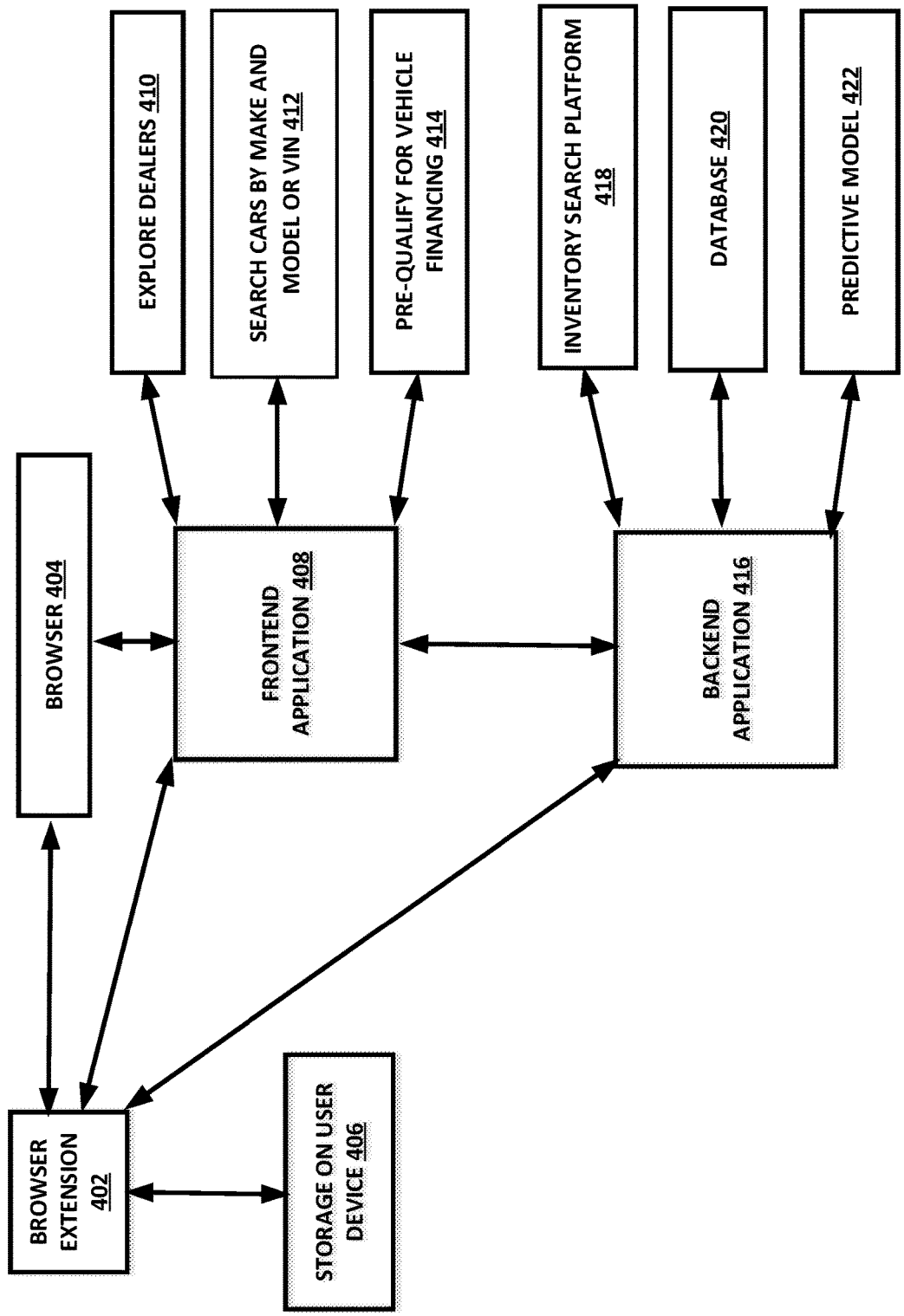
FIG. 4 illustrates a notification system according to an example embodiment.

FIG. 4 illustrates a notification system 400 according to an example embodiment. In system 400, a browser extension 402 may run in a browser 404 that is running on a user device. The browser extension 402 may store data in storage on the user device 406. The browser extension 402 may read and write user data on a font-end application 408 and a back-end application 416. The browser extension 402 may access information such as browsing history, bookmarks, cookies, in-browser messaging, web-based email, web-based social media, and installed extensions. The browser extension 402, browser 404, and applications 408, 416 may interact by exchanging messages or using APIs.

The browser 404 may interact with a frontend application 408 that, in turn, interacts with a backend application 416. The frontend application 408 may run on the user device while the backend application 408 may run on a server device, where the user device and server device communicate over a network to the application.

In system 400, the frontend application 408 may provide features and functions such as exploring dealers 410, searching cars by make and model or VIN 412, and pre-qualifying for vehicle financing 414. The user may search for cars that match the user's budget, lifestyle, location, and preferences, and save favorites. The user may pre-qualify to personalize financing and see payments specific to the user and the car the user wants. The user may select a car and financing ahead of time, taking an offer summary to the dealer. The user may search for dealers and/or cars nearby the user's location.

The browser extension 402 may run within the browser 404 and in the background with the applications 408, 416. The browser extension 402 may notify the user when, for example, vehicles are available that meet the user's criteria, when vehicles of interest have had changes to price or location, when a vehicle of interest has been sold, or has a special discount or promotion. The browser extension 402 may perform vehicle searches, check whether a vehicle fits the user's criteria, and provide notifications to the user. The browser extension 402 may be available for installation on a web store such as the Chrome web store, the Google Play Store, and the iOS App Store.

In system 400, the backend application 416 may interact with an inventory search platform 418, a database 420, and a predictive model 422. The inventory search platform 418 provides tools for searching inventory in various databases 420 and the browser extension 402 is a tool for searching within the browser 404. The browser extension 402 may present alerts, such as an icon indicating any push notifications, a drop-down menu and/or a pop-up display overlaying the user interface for the applications 408, 416. The browser extension 402 may collect data and update preferences based on the search history of the user. The browser extension 402 may continuously collect data or collect data in the background. The collected data may be used to update search results and provide notifications or alerts to the user. The browser extension 402 may apply the predictive model 422 to the collected data via the backend application 416. The collected data may be stored in the database 420 and/or in the storage on the user device 406.

Figure 5:
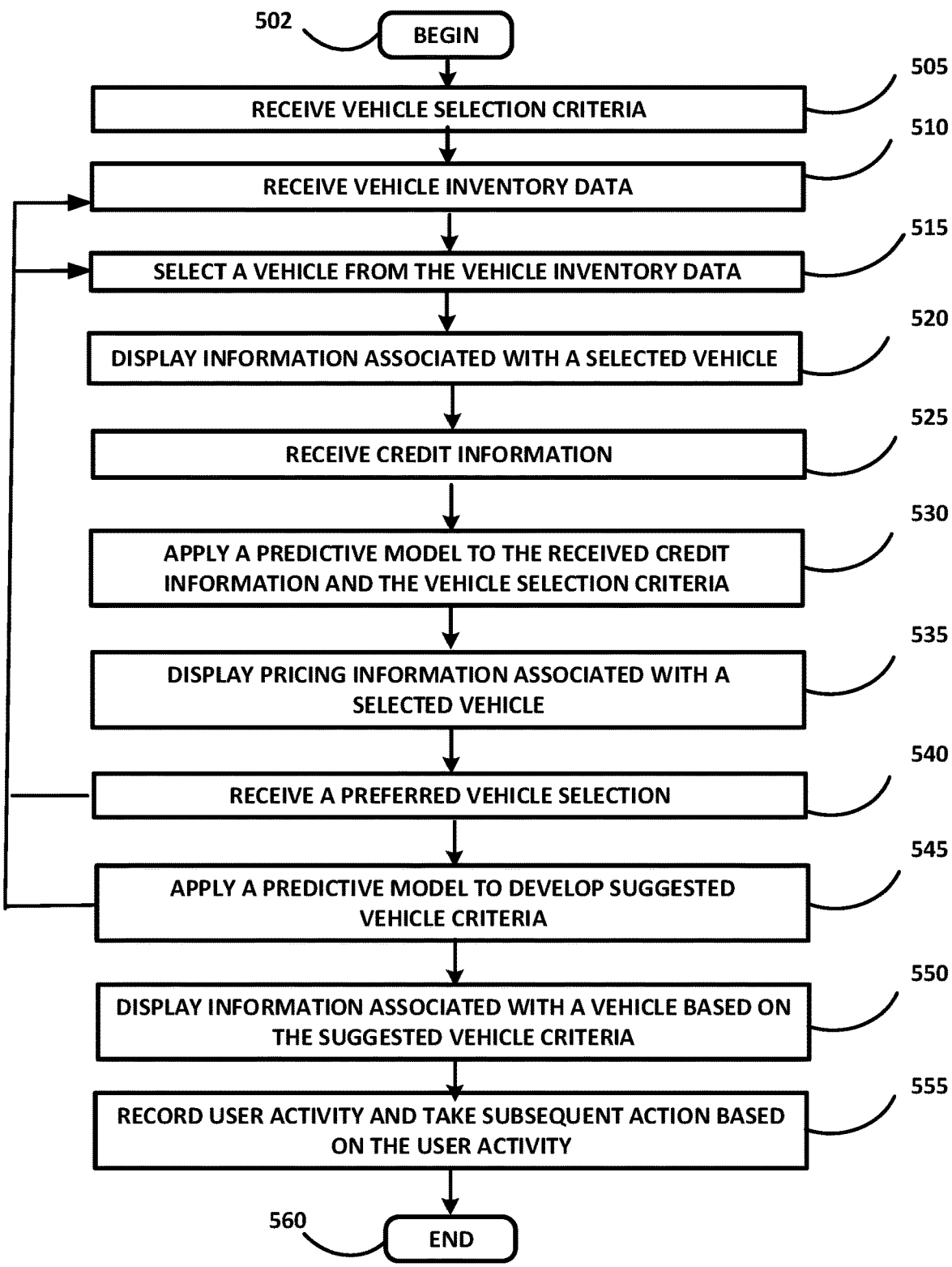
FIG. 5 is a flow chart illustrating the operation of the system according to an example embodiment.

FIG. 5 is a flow chart illustrating an exemplary embodiment of the operation of the disclosed system. The method 500 of FIG. 5 may reference the same or similar components as illustrated in FIG. 1, and FIG. 2.

Method 500 commences at block 502. Step 505 comprises receiving vehicle selection criteria from a user via a user interface. The user interface is displayed on a user device. For example, a user interface may be displayed as part of a web application and/or a plugin. The plugin may determine certain criteria based on user activity on websites. User activity may be on websites such as car sites like Auto Navigator, Edmonds, Carfax, AutoTrader, specific dealer sites, google searches, car review sites, etc. The plugin may infer selection criteria based on the user's activity in these web properties. Vehicle selection criteria may include any feature or aspect of a vehicle or vehicle purchase that the user may use to make a purchasing decision such as, for example, vehicle make, vehicle model, vehicle year, vehicle features, price, and/or location. In some embodiments, the user interface may be a software, program, website, or online application, or any plug-in, add-on, and/or extension associated with a software, program, website, or online application.

Method 500 continues at step 510 which comprises receiving vehicle inventory data from a database. The vehicle inventory data may include information associated with a vehicle, such as, for example, make, model, year, condition, address, date, location, city, state, zip code, body style, trim package, user price, whole-sale price, invoice price, auction price, mileage, four-wheel drive, all-wheel drive, two-wheel drive, front-wheel drive, rear-wheel drive, automatic transmission, manual transmission, exterior color, exterior accents, exterior trim, interior color, interior accents, interior trim, interior materials, number of owners, previous accidents, theft history, fuel economy, vehicle reviews, vehicle star rating, owner satisfaction rating, manufacturer suggested retail price (MSRP), allow wheels, aluminum wheels, backup camera, Bluetooth connectivity, cargo attachments, air-conditioning, heating, vented seats, cooled seats, cloth seats, leather seats, power seats, navigation system, additional power connections, power mirrors, power steering, premium audio/video features, sport suspension, sunroof/moon roof, additionally technology package, cruise control, adaptive cruise control, lane change assist, financing terms, insurance rates, amount financed, annual percentage rate (APR), total monthly payment, manufacturer incentives, and/or additional products available for a vehicle, such as, for example, service contracts, GAP insurance, time and wheel protection, extended warranties, whether a vehicle is used or new, if a vehicle was previously leased or owned, and/or if a vehicle was part of a rental and/or corporate fleet.

In some embodiments, the received vehicle inventory data relates to more than one vehicle. In some embodiments, the received vehicle inventory data is limited to vehicle inventory data that relates to vehicles that satisfy one, more than one, or all of the user's vehicle selection criteria.

Method 500 continues at step 515 which comprises selecting at least one vehicle from the vehicle inventory data based on the vehicle selection criteria. The selection of one or more than one vehicle may be based on the vehicle selection criteria and how closely a particular vehicle satisfies the vehicle selection criteria. In some embodiments, a vehicle may be selected if it satisfies at least a predetermined portion of the vehicle selection criteria. In some embodiments, the vehicle selection criteria may be weighted and a vehicle selected if it satisfied at least a certain portion of the weighted vehicle selection criteria.

Once at least one vehicle has been selected from the vehicle inventory data, step 520 comprises displaying information associated with a selected vehicle to the user on the user device. In some embodiments the displayed information may be streamlined to include a limited set of information that is determined to be the more relevant, such as, for example, the year, make, model, and/or price of the vehicle. In some embodiments, the user may select a particular vehicle in order to access a greater amount of information associated with a selected vehicle.

In some embodiments, step 525 comprises alerting the user to changes in the vehicle inventory data associated with the vehicle selection criteria. In some embodiments, an alert may be transmitted if any change associated with the vehicle selection criteria vehicle is detected for any vehicle in the vehicle inventory data. In some embodiments, an alert may only be sent if the detected change is related to a vehicle that was selected from the vehicle inventory data based on the received vehicle selection criteria. In some embodiments, an alert is sent if the detected change causes a vehicle that did not previous satisfy the vehicle selection criteria to, after the detected change, satisfy the vehicle selection criteria. In some embodiments, an alert is sent if the detected change causes a vehicle that previous satisfied the vehicle selection criteria to, after the detected change, no longer satisfy the vehicle selection criteria.

In some embodiments, method 500 comprises, at step 525, receiving credit information from a user via the user interface. In some embodiments, a user may be prompted to enter credit information after entering vehicle selection criteria. In some embodiments, a user may be prompted to enter credit information after at least one vehicle has been selected from the vehicle inventory data based on the vehicle selection criteria. In some embodiments, the credit information may be requested from a third party server rather than being entered by a user. In embodiments in which the credit information is received from a third party server, the user may be prompted to enter user information sufficient to request a user's credit information from a third party server such as, for example, the user's name, date of birther, place of birth, address, identification number, driver's license number, and/or social security number.

After vehicle selection criteria and credit information, step 530 comprises applying a predictive model to the received credit information and vehicle selection criteria. In some embodiments, the predictive model may be applied to determine whether to present a pre-approved offer of credit to the user. In some embodiments, the predictive model may use any received information to make this determination. In some embodiments, the predictive model may also base a determination of whether to present a pre-approved offer of credit to the user on one or more specific vehicles selected from the vehicle inventory data. In some embodiments, if a determination is made to present a pre-approved offer of credit to a user, a third party, such as, for example, a vehicle dealer, a bank, and/or a credit reporting agency, may be notified.

In some embodiments, step 535 comprises displaying pricing information associated with a selected vehicle. In some embodiments, pricing information is displayed upon determining to present a pre-approved offer of credit to the user. In some embodiments, pricing information is displayed after a vehicle is selected from the vehicle inventory data based on the vehicle selection criteria. In some embodiments, the displayed pricing information may relate to one or more than one selected vehicle. In some embodiments, pricing information and/or other information related to more than one selected vehicle may be presented in a manner that facilitates a direct comparison of the selected vehicles such as, for example, a side-by-side view of information related to the more than one selected vehicles.

In some embodiments, step 540 comprises receiving, from a user, a preferred vehicle selection. Once information, such as, for example, pricing information, related to one or more vehicles has been presented to the use, the user may be prompted to select a preferred vehicle. In some embodiments a user may select more than one preferred vehicle. In some embodiments, the set of more than one selected vehicles may be revised, edited, and/or updated in response to the received preferred vehicle selection and some or all of steps 515 through 540 or method 500 may be repeated. In some embodiments, this process may be iterative, thereby allowing the user to refine the selected vehicles as the user is presented with more information related to vehicles at least partially satisfying the vehicle selection criteria.

In some embodiments, instead of or in addition to revising the set of selected vehicles based on the users preferred vehicle selection, step 545 comprises applying a predictive model to the received vehicle selection criteria, preferred vehicle selection, and vehicle inventory data to develop suggested vehicle criteria. In some embodiments, the predictive model may utilize previous user experience in order to develop the suggested vehicle criteria. In some embodiments, the suggested vehicle criteria may be presented to the user for approval or disapproval. The suggested vehicle criteria may be used to present the user with potential options that do not satisfy the original vehicle selection criteria but may be likely to identify a vehicle the user will ultimately purchase.

In one non-limiting example, a user may enter vehicle selection criteria which very few if any vehicles fully satisfy. If vehicle selection criteria indicate the user is interested in a vehicle that has excellent gas mileage, is capable of seating eight people, has less than 10,000 miles, is less than 2 years old, and costs less than $10,000, it is possible that no vehicle in the vehicle inventory data satisfies all of these criteria. The predictive model may be applied to the vehicle selection criteria, preferred vehicle selection, and vehicle inventory data to suggest that the user consider a mid-size SUV which may be slightly older and slightly more expensive than the user's original vehicle selection criteria indicate. If the user approves or selects the suggested vehicle criteria the user may receive useful information related to a larger number of vehicles. It will be appreciated that in some cases, the user's original vehicle selection criteria may not produce a large number of results, thereby potentially frustrating the vehicle selection process. The predictive model may develop suggested criteria in order to allow the user to consider a wider array of options that are more likely to produce in a satisfactory vehicle for the user. In some embodiments, the suggested vehicle criteria may be used to notify the user of changes in the vehicle inventory data related to vehicles that satisfy some or all of the suggested vehicle criteria. In some embodiments, after developing the suggested vehicle criteria, step 550 comprises displaying information associated with at least one vehicle based on the suggested vehicle criteria.

In some embodiments, step 555 comprises, after obtaining permission from the user, recording user activity and taking subsequent action based on the user activity. In some embodiments, the subsequent action may include, for example, updating the vehicle selection criteria, sending an alert to a third party, sending a request to a third party, sending an alert to the user; and/or sending an incentive offer to the user. In some embodiments, subsequent actions may be taken based on the user's preferred vehicle selection and/or on the suggested vehicle criteria developed by the predictive model. Method 500 ends at block 560.

Figure 6A:
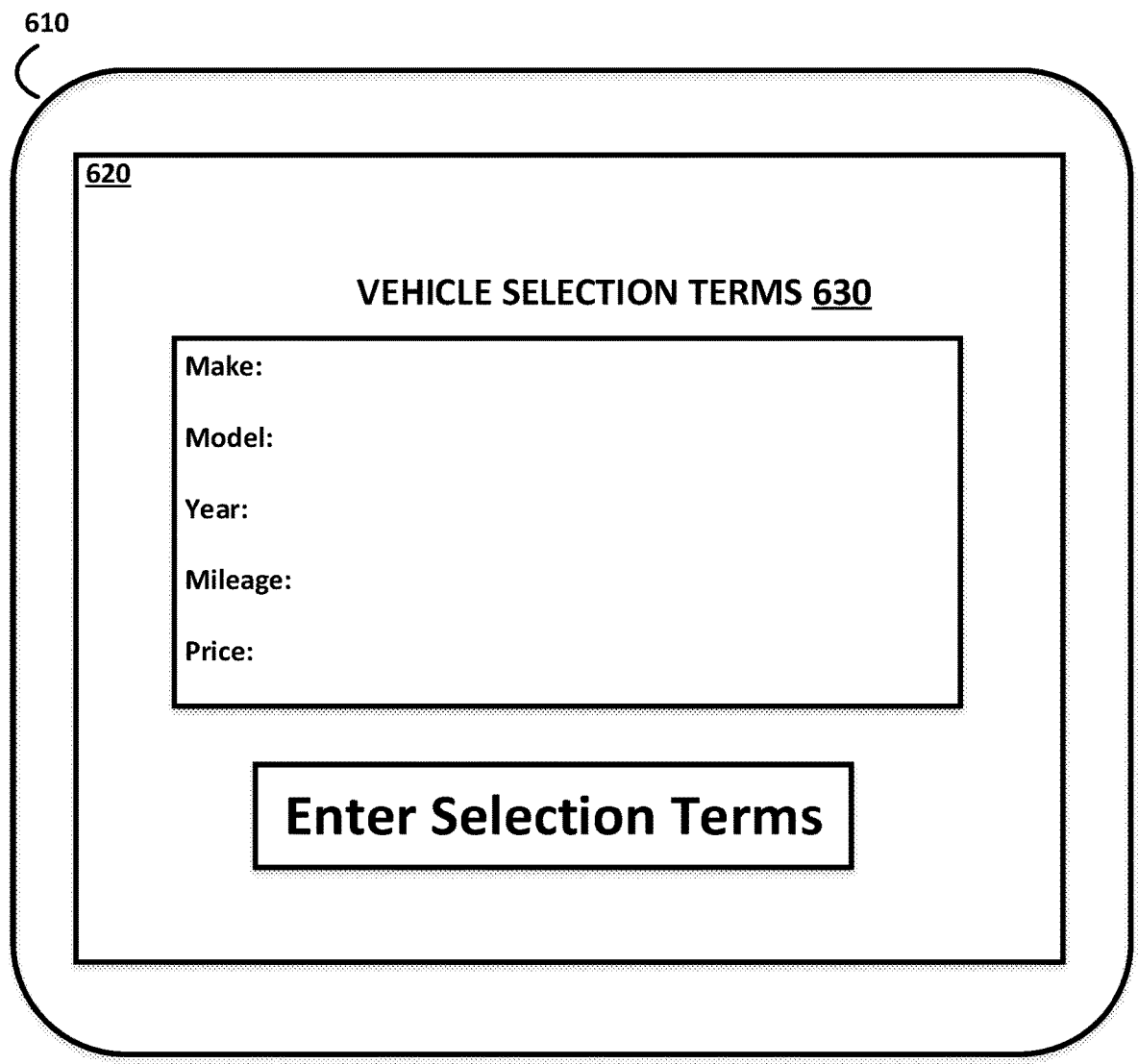
FIGS. 6A, 6B, 6C, and 6D illustrate a series of user interfaces according to example embodiments.
Figure 6B:
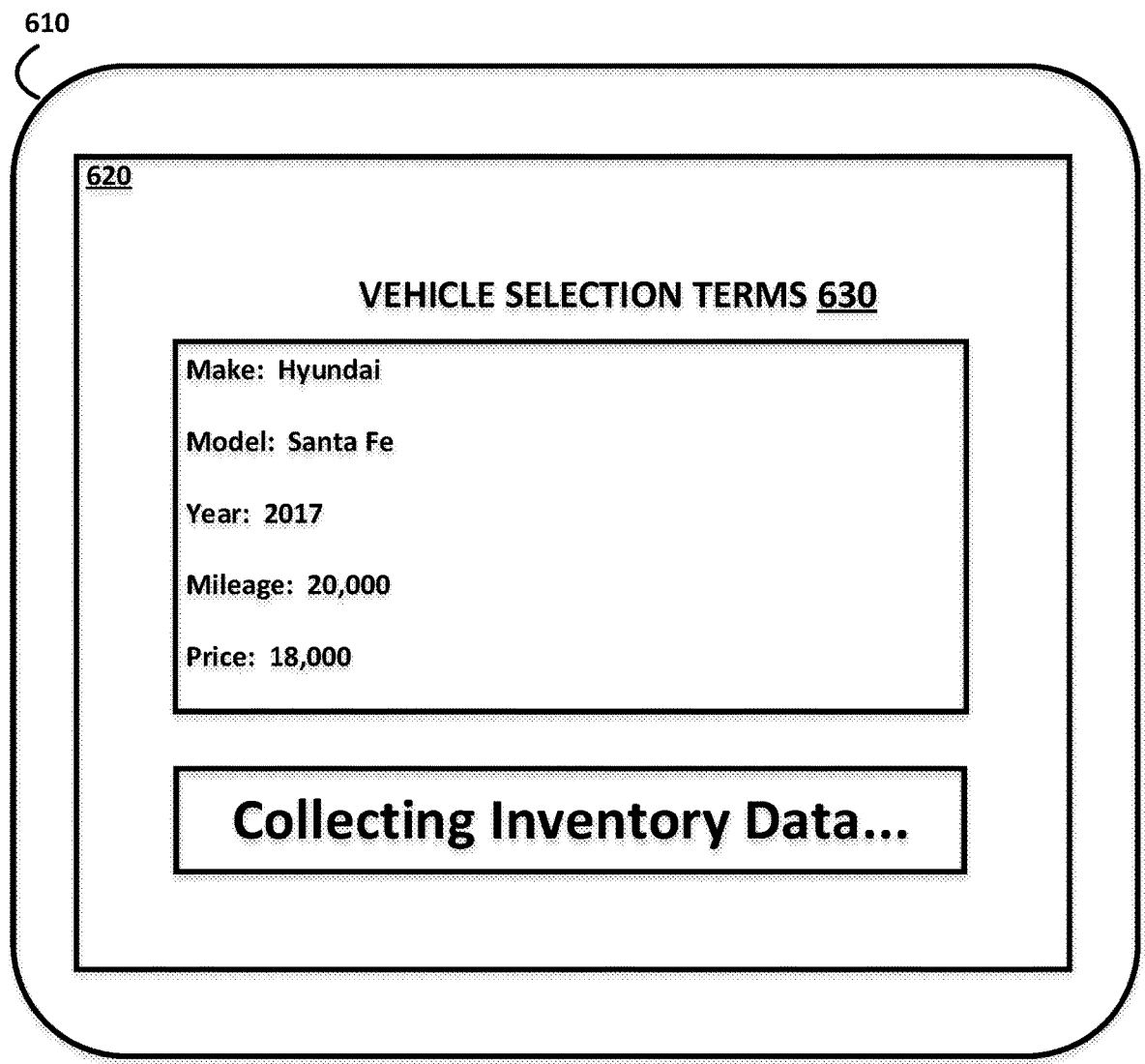
Figure 6C:
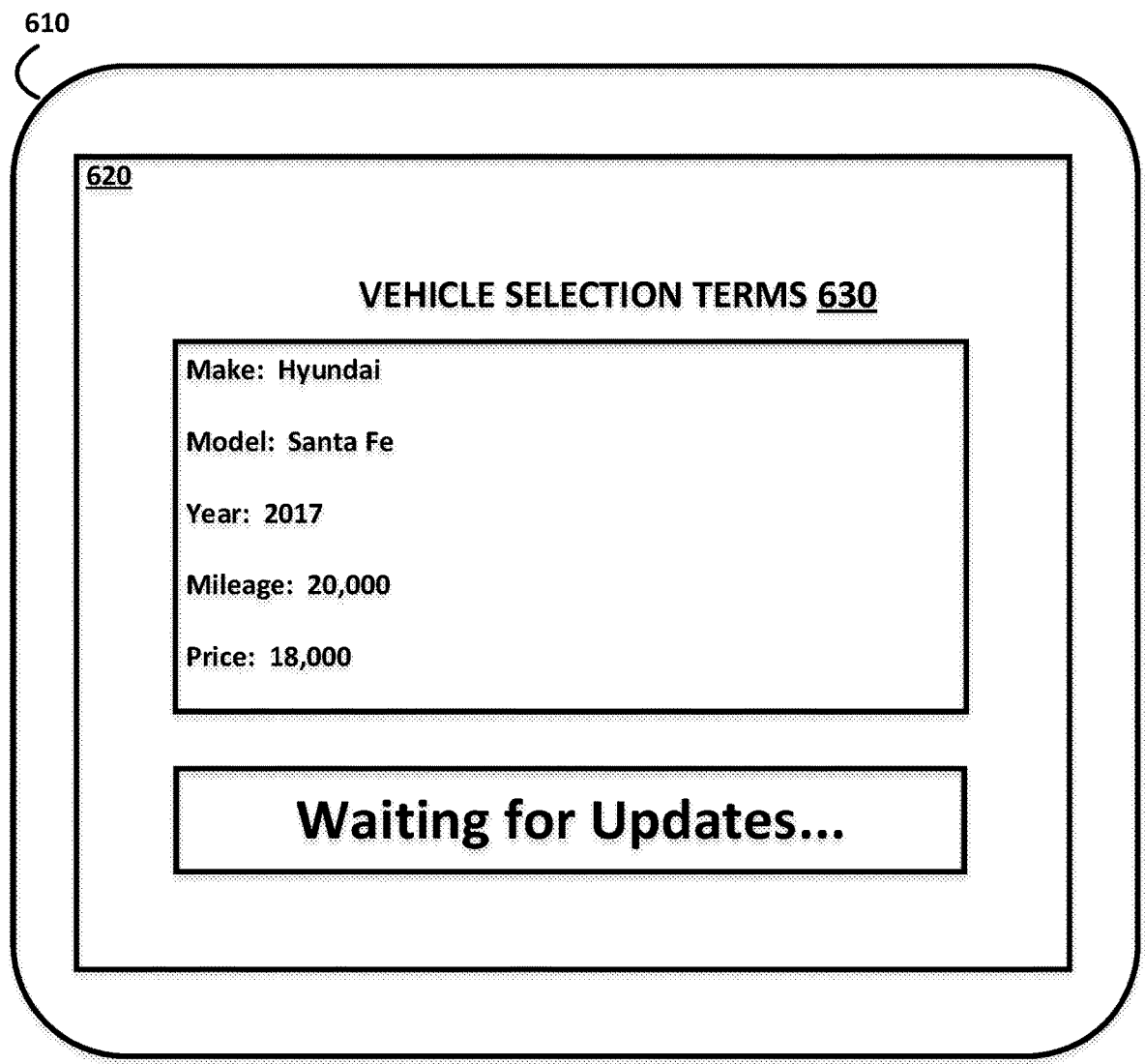

FIG. 6A through FIG. 6D illustrate a user interface according to an exemplary embodiment. As shown in FIG. 6A, user interface 620 may be displayed on a user device 610 and prompt a user to input vehicle selection terms 630. The vehicle selection terms 630 may relate to the purchase or potential future purchase of a vehicle, or may merely reflect characteristics of a vehicle in which the user is interested. The user interface 620 is in data communication with an application (not shown). Once the vehicle selection criteria 630 are entered into the user interface 620 by the user, the user interface may transmit the vehicle selection criteria 630 to the application. The application may collect or otherwise receive vehicle inventory data from a vehicle data server (not shown). In some embodiments, the receipt of data may occur in the background and/or be substantially invisible to the user. In some embodiments, such as the embodiment illustrated in FIG. 6B, the user interface 620 may display an image indicating the user interface 630 is transmitting information and/or the system is receiving or otherwise processing information.

Figure 6D:
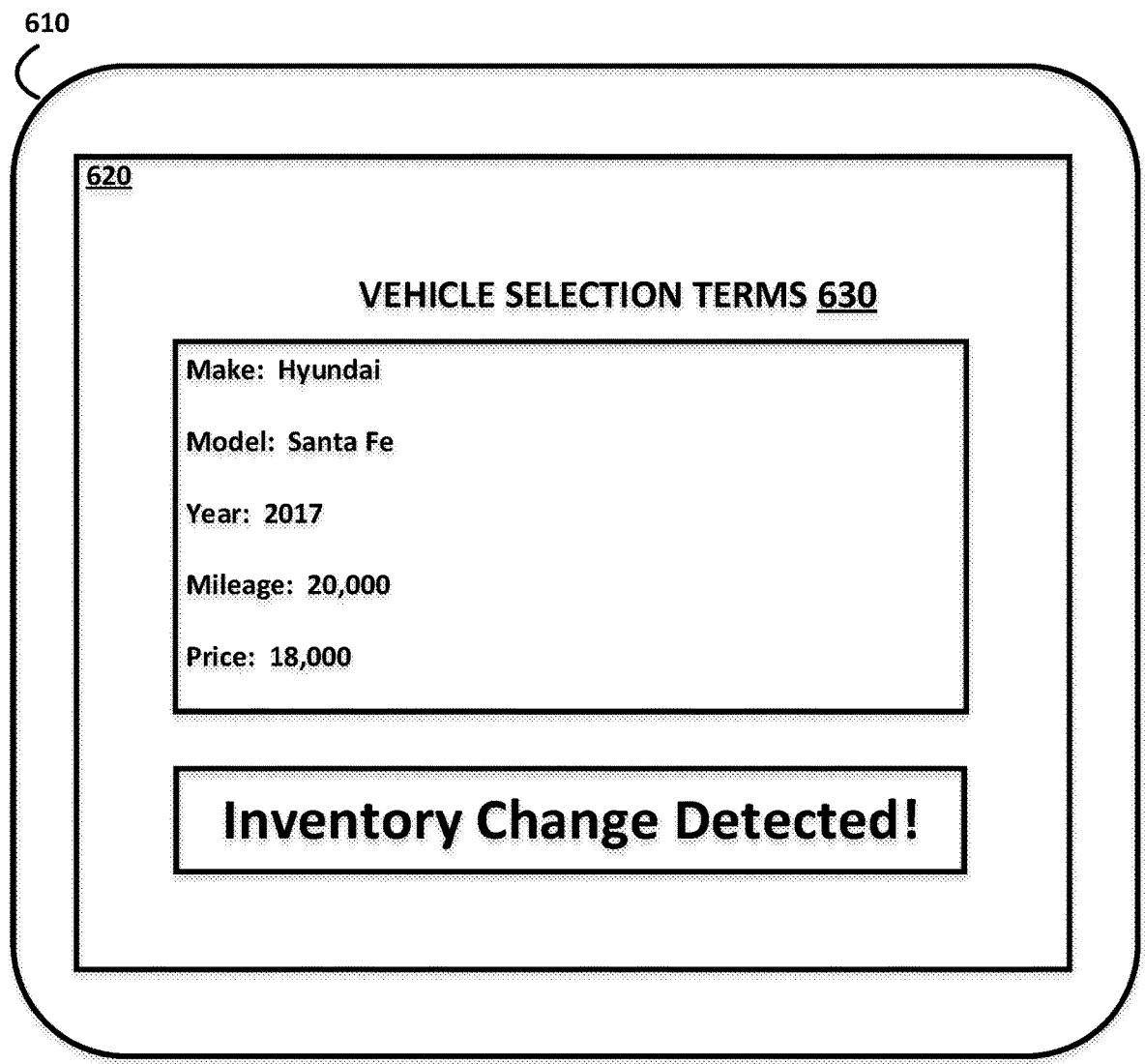

In some embodiments, once the user as entered vehicle selection terms 630 into the user interface 620 and the application has received the vehicle selection terms 630 and the vehicle inventory data, the user interface may then wait for future changes to the inventory data. In some embodiments, such as the embodiment illustrated in FIG. 6C, the user interface may indicate that the system has received the necessary information and is waiting for updates or changes to be made to the vehicle inventory data. Once the application detects a change to the vehicle inventory data that is associated with the vehicle selection terms 630, the application may transmit an alert to the user interface 620. As shown in FIG. 6D, the user interface 620 may display a message to the user indicating that a change to the vehicle inventory data associated with the vehicle selection terms 630 has been detected. In some embodiments, this message may additionally include a text message or email in addition to an update in the user interface 620.

Figure 7A:
FIGS. 7A and 7B illustrate user interfaces according to example embodiments.
Figure 7B:

FIGS. 7A and 7B illustrate a user interface 700 according to example embodiments. In FIG. 7A, the user interface 700 shows information about a particular car of interest to a user of an application. The user has installed a browser extension so that an icon 702 representing the browser extension is displayed on the user interface 700. The icon 702 indicates a number of push notifications, i.e., three notifications or alerts. If the user selects the icon 702, then as shown in FIG. 7B, a drop-down menu 704 or pop-up display overlays the user interface 700 to show the three example notifications or alerts. In drop-down menu 704, the user is notified or alerted that there are new matching cars, a price change on saved cars, and that the user is pre-qualified. If the user selects one of these items on the drop-down menu 704, then the browser extension or application user interface will display more information related to the alerts. After clicking on the icon 702 to display the alerts, the number of alerts may be reset to zero. When there are no alerts, clicking on icon 702 may display a drop-down menu 704 with default options such as settings or options. If the user selects new matching cars from drop-down menu 704, the browser extension and/or application may run or update a search and/or display saved results. If the user selects price change on saved cars, the browser extension and/or application may display one or more saved cars of interest and highlight the price change. If the user selects you're pre-qualified, the browser extension and/or application may provide financing information such as a summary document to bring to a dealer. If the user interface 700 is on a user device that is a mobile phone, the number of alerts may also be shown on an icon associated with an auto navigation application installed on the mobile phone, prompting the user to open the application. The browser extension may include options or settings where the user may choose one or more additional methods of notification such as sending email messages.

Example embodiments of the present disclosure provide for data collection regarding user activity and preferences that improves the vehicle marketing, research, and purchasing processes for both users and dealers. For example, a user may engage in considerable research efforts to determine what vehicles are available, which may include searching, web browsing, messaging, and social media activities, and the collection of relevant data from these activities may be used to provide focused and personalized notifications concerning vehicles and changes or events that may be of interest to the user. In this way, the user may receive an ongoing benefit from previous research activities and the dealer may receive information to focus marketing and sales efforts, as well as to quickly provide the user with notifications of changes or events that are likely to be of interest. In addition, the data collection may be performed in the background or otherwise unobtrusively, so as to not degrade the user's experience. Further, the alerts regarding changes or events may be provided so as to allow the user to avoid the tasks of monitoring a large number of vehicles and to receive the most current information regarding inventory.

Throughout the specification, reference is made to an application applying a predictive model. It will be understood that the application be any software or program, and that the predictive model may be any tool, database, dataset, software, program, or application which allows the application to determine likelihoods or probabilities of a set of variables such as vehicle inventory data satisfying a set of terms, such as the vehicle selection terms.

Throughout the specification, reference is made to vehicle marketing, sales, and purchasing. It is understood, however, that the present disclosure is not limited to vehicles and instead may be applied to any type of good or service that may be the subject of seller marketing and buyer discussion, investigation, and research.

Throughout the specification, reference is made to an application receiving information from a variety of sources. It will be understood that the application may receive information directly or indirectly from a database, server, memory and/or computer. The components form which the application receives information or data may be located remotely, locally, or, in some cases, be integral to the application or the hardware running the application.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    a user device displaying a user interface, wherein the user interface receives vehicle selection terms from a user via an input device operably connected to the user device;
    a data storage server containing vehicle inventory data; and
    an application communicatively connected to the user interface and the data storage server,
    wherein the application:
        records user interface activity by the user on the user device using an activity plugin;
        stores user interface activity using the activity plugin;
        receives vehicle selection terms from the user using the user interface;
        determines suggested vehicle selection terms based on the user interface activity by applying a predictive model to the user interface activity, wherein the predictive model is built by machine learning using at least one algorithm selected from the group of gradient boosting machine, logistic regression, or neural networks;
        receives vehicle inventory data from the data storage server;
        modifies the vehicle selection terms based on the suggested vehicle selection terms and the vehicle inventory data;
        monitors vehicle inventory data stored by the data storage server for changes associated with the modified vehicle selection terms using at least one inventory plugin;
        determines a change to the vehicle inventory data which is associated with the modified vehicle selection terms by accessing an application programming interface using the at least one inventory plugin associated with the application;
        transmits an alert to the user interface upon detecting the change to the vehicle inventory data; and
        displays the alert on the user device,
    wherein the application is configured to operate in the background until the determination of the change to the vehicle inventory data by the at least one inventory plugin.

2. The system of claim 1, wherein the vehicle selection terms comprise at least one of vehicle make, vehicle model, vehicle year, vehicle features, price, and location.

3. The system of claim 1, wherein the application is configured to automatically execute an application update without input from the user.

4. The system of claim 1, wherein the user interface receives payment criteria from the user.

5. The system of claim 4, wherein the application:
    determines suggested payment criteria based on the user interface activity by applying the predictive model to the user interface activity; and
    modifies the payment criteria based on the suggested payment criteria.

6. The system of claim 1, wherein the application uses the predictive model to determine at least one event for the at least one inventory plugin to determine the alert.

7. The system of claim 1, wherein the user interface activity includes activity performed by the user on a website.

8. The system of claim 1, wherein the user interface receives credit information from the user.

9. The system of claim 8, wherein, upon receipt of a pre-approval request, the application applies the predictive model to the received credit information and the vehicle selection terms to determine whether to present a pre-approved offer of credit to the user.

10. The system of claim 9, wherein upon determining to present the pre-approved offer of credit to the user, the user interface displays price information and financing information associated with a vehicle to the user.

11. The system of claim 10, wherein, upon displaying the price information and the financing information to the user, the application prompts the user to select a preferred vehicle.

12. The system of claim 10, wherein, prior to displaying the price information, the application sends a price adjustment request to a vehicle dealer.

13. The system of claim 9, wherein upon determining to present the pre-approved offer of credit to the user, the application transmits the modified vehicle selection terms to the vehicle dealer.

14. A method performed by an application, the method comprising:
receiving vehicle selection criteria via a user interface, wherein the user interface is displayed on a user device;
recording user interface activity by a user on the user device using an activity plugin;
storing user interface activity using the activity plugin;
determining suggested vehicle selection terms based on the user interface activity by applying a predictive model to the user interface activity, wherein the predictive model is built by machine learning using at least one algorithm selected from the group of gradient boosting machine, logistic regression, or neural networks;
receiving vehicle inventory data from a database, wherein the vehicle inventory data comprises information associated with a vehicle;
modifying the vehicle selection criteria based on the suggested vehicle selection terms and the vehicle inventory data;
selecting at least one vehicle from the vehicle inventory data based on the modified vehicle selection criteria;
monitoring vehicle inventory data stored by a data storage server for changes associated with the modified vehicle selection criteria using at least one inventory plugin;
determining a change to the vehicle inventory data which is associated with the modified vehicle selection criteria by accessing an application programming interface using the at least one inventory plugin associated with the application; and
alerting a user to the change by displaying an alert on the user device,
wherein the application is configured to operate in the background until the determination of the change to the vehicle inventory data by the at least one inventory plugin.

15. The method of claim 14, further comprising:
receiving credit information via the user interface;
applying the predictive model to the received credit information and the modified vehicle selection criteria to determine whether to present a pre-approved offer of credit; and
displaying pricing information associated with the selected vehicle upon determining to present the pre-approved offer of credit to the user.

16. The method of claim 14, further comprising using the predictive model to determine at least one event for the at least one inventory plugin to determine the alert.

17. The method of claim 14, wherein the user interface activity includes activity performed by the user on a website.

18. The method of claim 14, further comprising
determining payment criteria based on the user interface activity by applying the predictive model to the user interface activity.

19. A user retention system comprising:
a user device comprising at least one input device;
a user interface, wherein the user interface receives vehicle selection criteria and financing information from a user;
a vehicle inventory database communicatively connected to the user interface wherein the vehicle inventory database contains vehicle information; and
an application communicatively connected to the user interface, wherein the application:
records user interface activity by the user on the user interface using an activity plugin;
stores user interface activity using the activity plugin;
receives vehicle selection criteria and financing information from the user interface;
receives vehicle information from the vehicle inventory database;
applies a predictive model to the received vehicle selection criteria, the financing information, the user interface activity, and the vehicle information to determine whether to present a pre-approved offer of credit to the user, wherein the predictive model is built by machine learning using at least one algorithm selected from the group of gradient boosting machine, logistic regression, or neural networks;
monitors vehicle inventory data stored by the data storage server for changes associated with the vehicle selection criteria using at least one inventory plugin;
determines a change to the vehicle information which is associated with the vehicle selection criteria by accessing an application programming interface using the at least one inventory plugin associated with the application; and
displays an alert on the user interface upon detecting the change,
wherein the application is configured to operate in the background until the determination of the change to the vehicle inventory data by the at least one inventory plugin.

20. The user retention system of claim 19, wherein the application uses the predictive model to determine at least one event for the at least one inventory plugin to determine the alert.

* * * * *